United States Patent [19]
Markham

[11] Patent Number: 5,401,394
[45] Date of Patent: Mar. 28, 1995

[54] WATER TREATMENT SYSTEM ULTRAVIOLET BULB VOLTAGE MONITOR CIRCUIT

[75] Inventor: Ronald C. Markham, Kentwood, Mich.

[73] Assignee: Amway Corporation, Ada, Mich.

[21] Appl. No.: 2,820

[22] Filed: Jan. 11, 1993

[51] Int. Cl.⁶ .............................................. B01D 17/12
[52] U.S. Cl. .................................... 210/85; 210/94; 210/192; 250/432 R; 250/435; 315/133; 340/662; 340/663; 422/119; 422/186.3
[58] Field of Search .................. 210/85, 94, 192, 243, 210/748, 746; 422/24, 119, 186.3; 315/307, 308, 129, 134, DIG. 4, 133; 340/660, 662, 663, 661; 250/432 R, 435, 436

[56] References Cited

U.S. PATENT DOCUMENTS

| | | | |
|---|---|---|---|
| 2,263,162 | 11/1941 | Collins | 422/24 |
| 3,182,193 | 5/1965 | Ellner et al. | 422/24 |
| 3,462,597 | 8/1969 | Young | 422/24 |
| 3,471,693 | 10/1969 | Veloz | 250/436 |
| 3,491,234 | 1/1970 | Wiltrout | 422/24 |
| 3,948,772 | 4/1976 | Ellner | 422/24 |
| 4,051,411 | 9/1977 | Knoble et al. | 315/205 |
| 4,063,890 | 12/1977 | Baron | 422/24 |
| 4,141,686 | 2/1979 | Lewis | 250/436 |
| 4,204,956 | 5/1980 | Flatow | 422/24 |
| 4,255,383 | 3/1981 | Schenck | 422/24 |
| 4,255,663 | 3/1981 | Lewis | 250/436 |
| 4,291,302 | 9/1981 | King et al. | 340/660 |
| 4,318,031 | 3/1982 | Lonseth et al. | 315/133 |
| 4,336,223 | 6/1982 | Hillman | 422/24 |
| 4,348,357 | 9/1982 | Bithell | 422/22 |
| 4,400,270 | 8/1983 | Hillman | 210/103 |
| 4,471,225 | 9/1984 | Hillman | 250/436 |
| 4,615,799 | 10/1986 | Mortensen | 210/117 |
| 4,665,627 | 5/1987 | Wilde et al. | 34/4 |
| 4,682,084 | 7/1987 | Kuhnel et al. | 315/307 |
| 4,752,401 | 6/1988 | Bodenstein | 210/746 |
| 4,769,131 | 9/1988 | Noll et al. | 210/85 |
| 4,831,564 | 5/1989 | Suga | 324/114 |
| 4,849,115 | 7/1989 | Cole et al. | 422/24 |
| 5,006,244 | 4/1991 | Maarschalkerweerd | 210/192 |
| 5,023,460 | 6/1991 | Foster, Jr. et al. | 250/455.1 |
| 5,230,792 | 7/1993 | Sauska et al. | 210/243 |

*Primary Examiner*—Joseph W. Drodge
*Attorney, Agent, or Firm*—Warner Norcross & Judd

[57] ABSTRACT

The specification discloses a circuit for monitoring the status of an ultraviolet (UV) light bulb in a water treatment system. The circuit uses either transformers or zener diodes with opto-isolators to monitor the voltage across the bulb. A logic signal is emitted when abnormally high voltage is detected, for example, indicating that the bulb is burned out, broken, or missing. A logic signal also is emitted when abnormally low voltage is detected, for example, indicating that the starter circuit is short circuited or that power is interrupted.

12 Claims, 2 Drawing Sheets

WATER TREATMENT SYSTEM ULTRAVIOLET BULB VOLTAGE MONITOR CIRCUIT

BACKGROUND OF THE INVENTION

The present invention relates to water treatment systems, and more particularly, to a circuit for monitoring the status of an ultraviolet bulb in such a system.

Household water treatment systems are gaining popularity—particularly in areas with less than ideal potable water. A household unit is mounted on a single tap to treat selectively water flowing through the tap. Treatment may include filtration, irradiation, or both.

The most effective water treatment systems include ultraviolet (UV) irradiation for sterilizing the water stream. It is well known that such UV treatment kills bacteria and viruses with an extremely high degree of reliability. The water to be treated is routed through a chamber, and a UV light source within or adjacent to the chamber directs UV light through the water stream.

The effectiveness of irradiation depends upon the status of the UV bulb. The bulb may not be operating properly for a variety of reasons. The bulb may be "burned out"; the bulb may be broken; or power to the bulb may be interrupted. Alerting the consumer to a nonoperative bulb is desirable for two reasons. First, the consumer is not getting UV-treated water. Since the water will not look or taste different, the consumer needs to be alerted. Second, if the bulb is broken, glass shards may be in the system. In this case, the bulb also could be trying to light, causing the starter to prematurely fail and/or the ballast to overheat.

A variety of prior art techniques have been developed for monitoring bulb status. A first technique includes positioning a photo detector within the irradiation field to monitor for light emitted from the bulb. However, such detectors are relatively expensive, undesirably increasing the cost of the treatment unit. Examples of this technique can be found in U.S. Pat. Nos. 4,769,131; 4,752,401; 4,682,084; 4,665,627; 4,255,383; 3,948,772; 3,491,234; 3,471,693; 3,182,193; and 2,263,162.

A second technique is to provide an indicator, such as a light-emitting device (LED), that is illuminated when current is flowing through the bulb and unilluminated otherwise. One disadvantage of this technique is that the indicator is illuminated at any time that current is flowing through the circuit regardless of whether the bulb is illuminated. For example, the indicator light would indicate proper operation when the bulb is attempting to light and/or when the circuit is shorted. In neither case is the bulb actually providing irradiation. Consequently, this technique provides a false level of assurance. Examples of this technique are illustrated in U. S. Pat. Nos. 5,023,460; 4,255,663; and 4,141,686. Another illustration of current monitoring, but without an LED, is shown in U.S. Pat. No. 4,615,799.

Bulb intensity control circuits may monitor one or more of lamp output, temperature, voltage, or current. However, the monitored parameters in such systems are used to control bulb intensity only. Such circuits do not provide any indication of the bulb status. Examples of such control systems are illustrated in U.S. Pat. Nos. 4,831,564; 4,471,225; 4,400,270; and 4,336,223.

SUMMARY OF THE INVENTION

The aforementioned problems are solved in the present invention, which effectively, simply, and inexpensively monitors the status of the UV bulb within a water treatment system. More particularly, the monitoring circuit includes a voltage detection circuit coupled in parallel across the bulb. The monitoring circuit further includes means for emitting a status signal when the voltage is undesirably high (as might be associated with a burned out bulb or a broken bulb) or when the voltage is undesirably low (as might be associated with a short circuit).

Preferably, the status of the bulb is indicated via status signals that are in a format compatible with a CMOS processor or logic inputs. Such an arrangement enables the bulb status to be processed by a microprocessor which would then indicate to the consumer the status of the bulb in a user-friendly manner.

In the preferred embodiment, the voltage detector is a pair of circuits, each including a zener diode and an opto-isolator to electrically insulate the monitoring circuit from the bulb power circuit. This arrangement is desirable in an electrical system used in conjunction with water.

These and other objects, advantages, and features of the invention will be more readily understood and appreciated by reference to the detailed description of the preferred embodiment and the drawings.

DETAILED DESCRIPTION OF THE PREFERRED EMBODIMENTS

Figure 3:
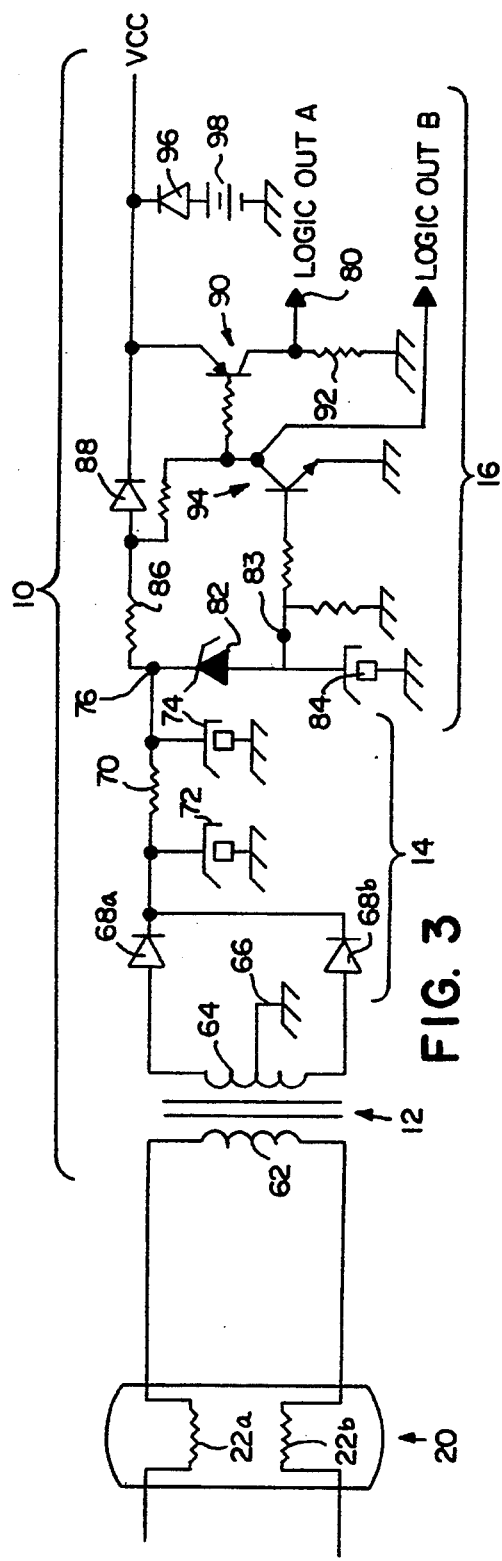
FIG. 3 is a schematic circuit diagram of the bulb status monitor circuit of a first embodiment of the present invention.

The first embodiment of the ultraviolet (UV) monitor circuit of the present invention is illustrated in FIG. 3 and generally designated 10. The circuit includes a transformer 12, a rectification circuit 14, and a signal generation circuit 16. The transformer 12 is coupled in parallel with a UV bulb 20 to step down the voltage across the bulb. The transformer secondary current is rectified by the circuit 14 and applied to the circuit 16. A signal is outputted in CMOS compatible form by the circuit 16 whenever the voltage across the bulb 20 is undesirably high or undesirably low.

The voltage which the bulb 20 inherently seeks is referred to as "the sustaining voltage." The sustaining voltage typically is selected to be approximately one-half of the line voltage. Two conditions can drastically change the sustaining voltage. First, when there is no current through the bulb, there is no voltage drop across the inductor 52; and the voltage across the bulb is full line voltage. Second, if the starter shorts out, the voltage across the bulb is zero.

Therefore, the bulb status can be monitored by detecting for these three distinctly different voltage levels (i.e. line voltage, sustaining voltage, and zero voltage) across the bulb. Sustaining voltage indicates that the lamp is functioning properly. Line voltage indicates that the bulb is burned out, broken, or missing. Zero voltage indicates that the starter is shorted out or that power is interrupted.

Figure 1:
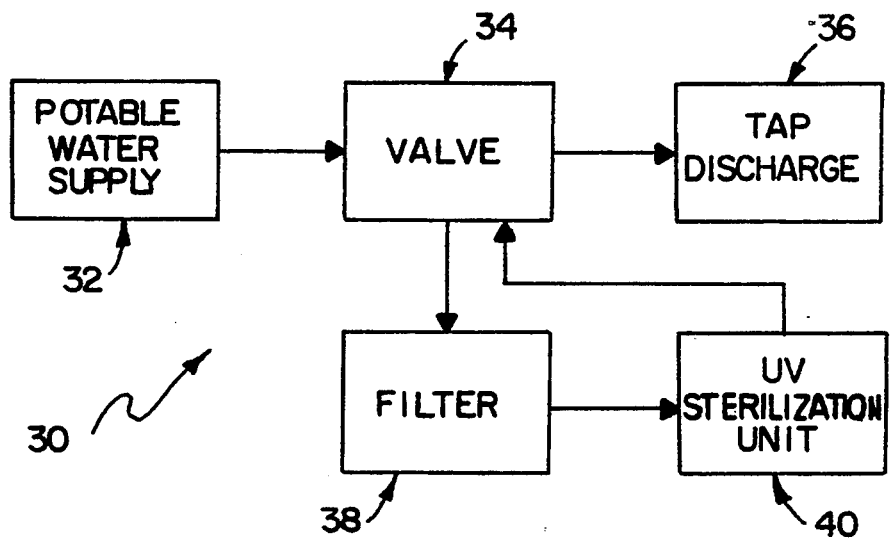
FIG. 1 is a block diagram of a water treatment system in which the UV bulb status monitor circuit of the present invention may be used.

The bulb status monitor circuit of the present invention would be included in a water treatment system of the type illustrated in FIG. 1 and generally designated 30. The line connections illustrated between the blocks of FIG. 1 are fluid connections permitting water flow through the treatment system. Generally speaking, the water treatment system is connected to a potable water supply 32 and includes a valve 34 for selectively routing water either directly to the tap discharge 36 or to the filter and sterilization units 38 and 40 respectively. The valve may be of the type illustrated in copending application Ser. No. 07/977,161, filed Nov. 16, 1992, and entitled FAUCET DIVERTER VALVE.

In the water treatment system 30, the water can be sent directly to the tap discharge 36 by putting the valve 34 in a first manually selected position. Alternatively, the valve 34 can be placed in a second manually selected position where the water is routed sequentially through the filter 38 and the sterilization unit 40 before being discharged from the tap at 36. The filter 38 is preferably a carbon-activated filter. The UV sterilization unit includes a water chamber, container, or passageway in conjunction with an ultraviolet (UV) source of light for sterilizing water flowing therethrough.

Figure 2:
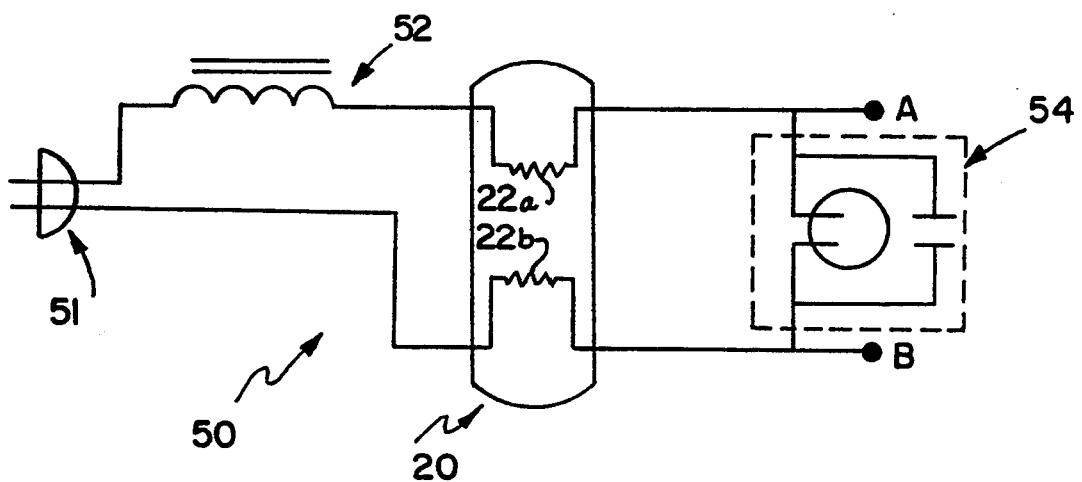
FIG. 2 is a schematic circuit diagram of a conventional, and therefore prior art, UV power circuit.

A conventional UV power system for such a water treatment system is illustrated in FIG. 2 and generally designated 50. The system includes a UV bulb 20, a ballast 52, and a starter circuit 54. The plug 51 or other power connection is conventional and is selected to be compatible with the power distribution system to which the circuit is to be connected. Although the power connection is illustrated as a conventional plug, the system also may be hard-wired to the power source. The ballast 52 also is conventional. The impedance of the ballast is selected to reduce the current through the UV bulb to an ideal value for which the bulb is designed. The bulb 20 is a conventional gas-discharge UV bulb including a pair of filaments 22a and 22b. The filaments are connected in series with the ballast 14. The bulb acts as a voltage regulator. As the impedance of the ballast increases, the current through the bulb decreases. Any increase in current decreases the impedance of the bulb, thus maintaining the voltage across the bulb essentially constant. Finally, the starter circuit 54 is also of conventional construction and is connected in series between the filaments 22.

Figure 4:
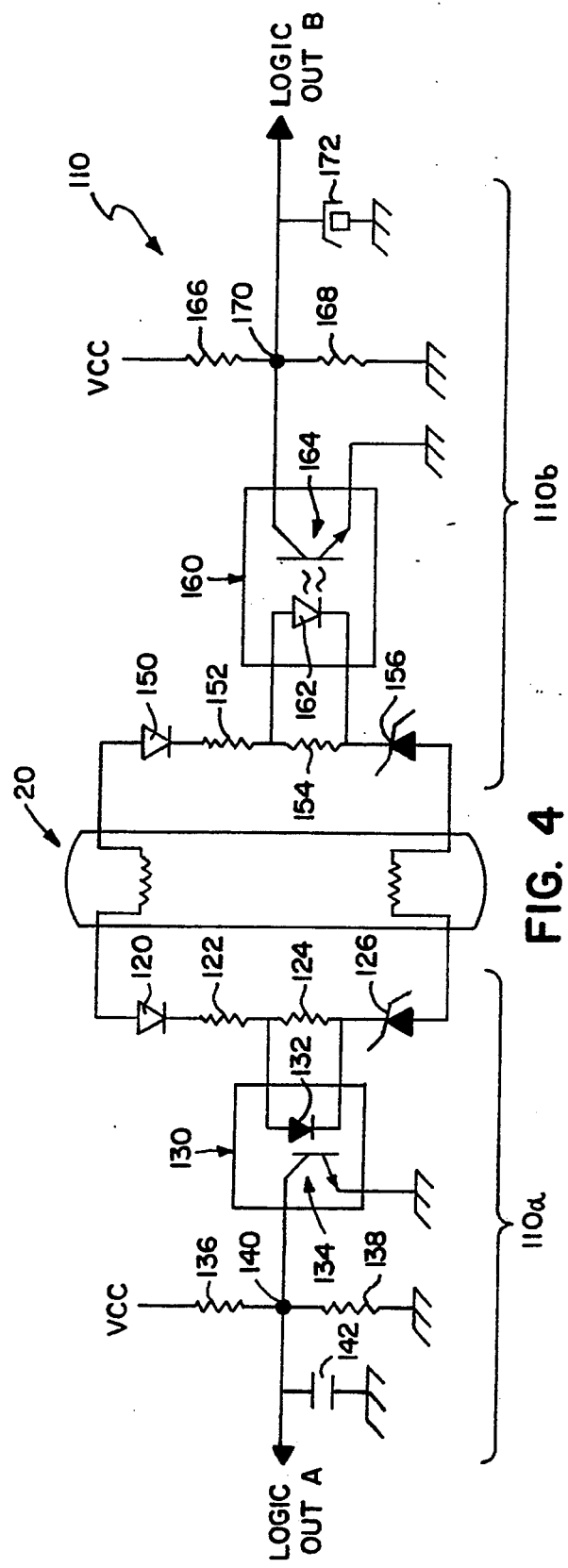
FIG. 4 is a schematic circuit diagram of the bulb status monitor circuit of a second embodiment of the present invention.

In FIGS. 3 and 4, illustrating the alternative embodiments of the present invention, the components of FIG. 2 other than the bulb 20 have been omitted for clarity. Accordingly, FIGS. 3 and 4 each show the bulb 20 in conjunction only with the bulb status monitor circuit.

As previously mentioned, the embodiment 10 illustrated in FIG. 3 includes a transformer 12, a rectifier circuit 14, and a signal emitting or generation circuit 16. The transformer 12 includes a primary 62 connected in parallel across the bulb 20. The secondary 64 of the transformer 12 is center-tap grounded at 66. The transformer 12 therefore steps down the voltage across the bulb 20.

The rectification circuit 14 is conventional and includes a pair of diodes 68a and 68b electrically connected to opposite sides of the secondary 64. The outputs of the diodes are connected in series with a resistor 70 having grounded capacitors 72 and 74 on either side thereof. Accordingly, a DC voltage appears at node 76, which is directly proportional to the AC voltage across the bulb 20.

The signal generation circuit 16 generates a CMOS-compatible logic output at node 80, which can be used by a microcontroller (not shown) operating the system. Node 76 is connected through a zener diode 82, a node 83, and a capacitor 84 to ground. The conducting voltage of the zener diode is selected so that the voltage generated by the rectification circuit 14 will not cause the diode to conduct when the bulb is at normal sustaining voltage. In this embodiment, that voltage is 4.7 volts. Node 76 is also connected through resistor 86 and diode 88 to the supply voltage VCC. A battery 98 backup is connected through diode 96. Transistor 90 is series connected with resistor 92 between VCC and ground. The output of the transistor 90 at node 80 is the CMOS LOGIC OUT A point. Transistor 94 switches transistor 90 and therefore LOGIC OUT B under the control of the signal at node 83.

When the primary of the transformer 12 (i.e. bulb voltage) goes to the line voltage (e.g. 100 volts) (meaning the bulb is not lit or is trying to light), the zener diode 82 turns on. The signal at 83 turns on transistors 94 and 90 to provide a high logic output at LOGIC OUT A and low logic output at LOGIC OUT B. When the primary voltage of the transformer 12 goes to zero volts (meaning shorted starter or no power), current will be supplied to the circuit 16 by the battery 98 backup as diode 96 will be allowed to conduct because of the absence of the rectified supply voltage. In such case, both LOGIC OUT A and LOGIC OUT B are low. When the bulb is at sustaining voltage (e.g. 45 volts) (meaning bulb lit), the logic output at LOGIC OUT A is low; and the logic output at LOGIC OUT B is high.

Hence, the output at LOGIC OUT A is high if the voltage is abnormally high; and the output at LOGIC OUT B is low if the voltage is either abnormally low or abnormally high. As explained above, abnormally low voltage would indicate no power or a shorted starter. Abnormally high voltage would mean a burned out bulb, a broken bulb, or a missing bulb. In any of these events, the consumer should be notified. On the other hand, the logic output at LOGIC OUT A is low and the logic output at LOGIC OUT B is high when the bulb is irradiating.

SECOND EMBODIMENT

An alternative embodiment of the bulb status monitor circuit, and presently the preferred embodiment, is illustrated in FIG. 4 and generally designated 110. The circuit 110 includes a high voltage monitor 110a and a low voltage monitor 110b. Monitor 110a emits a high logic output (or in the absence of capacitor 142 a series of pulses) when the voltage is abnormally high, and monitor 110b emits a low logic output (or in the absence of capacitor 172 a series of pulses) when the voltage is abnormally low.

The high-voltage monitor circuit 110a includes series-connected diode 120, resistors 122 and 124, and zener diode 126 coupled in parallel across the bulb 120. Opto-isolator 130 includes an LED (light emitting diode) or other light-emitting device 132 and a phototransistor 134. The LED 132 is coupled in parallel with the resistor 124. A pair of resistors 136 and 138 are series connected between the supply voltage VCC and ground. The collector of the transistor 134 is electrically connected to node 140 between resistors 136 and 138. Node 140 is the logic output. Capacitor 142 is provided between the node 140 and ground for the purpose of filtering out the 60 hertz component of the AC power signal.

The turn-on voltage of the zener diode 126 is selected as a value approximately midway between the sustaining voltage and the abnormally high voltage to be monitored for. In the disclosed embodiment, this is 75 volts. So long as the bulb voltage does not exceed this abnormally high voltage, zener diode 126 does not conduct; LED 132 is not illuminated; transistor 134 does not conduct; and the logic output at 140 is high. The output at LOGIC OUT A is high (or in the absence of capacitor 142 a series of pulses) if and only if the bulb voltage is abnormally high.

The low-voltage monitor 110d includes series-connected diode 150, resistors 152 and 154, and zener diode 156 coupled in parallel with the bulb 20. Opto-isolator 160 includes an LED 162 or other light emitting device and phototransistor 164. The LED 162 is connected in parallel with the resistor 154. Resistors 166 and 168 are series connected between the supply voltage VCC and ground. Output node 170 is located between the two resistors 166 and 168. Capacitor 172 is included to filter out the 60 hertz component of the AC power signal.

The logic output at node 170 depends on the voltage across the bulb 20. Specifically, the conducting voltage of the zener diode 156 is selected to be between zero and the sustaining voltage. In the preferred embodiment this is 1.6 volts. When the bulb is operating at a normal voltage (i.e. sustaining voltage), the zener diode 156 conducts; the LED 162 is illuminated; the phototransistor 164 conducts; and a low logic output is provided at LOGIC OUT B. When the voltage becomes abnormally low, zener diode 156 does not conduct; and the logic output at node 170 is high. Accordingly, the output signal at the output node 170 is low (or in the absence of capacitor 172 a series of pulses) if and only if the bulb voltage is above the predetermined abnormally low voltage and high otherwise.

A microprocessor (not shown) is coupled to output node 140 and 170 to provide communication with the consumer. The microprocessor receives a CMOS-compatible signal from the circuits 110a and 110b.

The above descriptions are those of preferred embodiments of the invention. Various alterations and changes can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. An improved water treatment system comprising a chamber, an ultraviolet (UV) light bulb for directing UV light through said chamber, a ballast and a starter circuit both connected to said bulb, and monitor means for monitoring the status of said UV bulb, the improvement comprising said monitor means comprising:
voltage monitor means for monitoring the voltage across said bulb; and
signal means responsive to said voltage monitor means for emitting respective signals in response to the monitored voltage being within a desired range, in response to the monitored voltage being higher than the desired range, and in response to the monitored voltage being lower than the desired range.

2. An improved water treatment system as defined in claim 1 wherein said voltage monitor means comprises a transformer connected in parallel across said bulb for stepping down the voltage across said bulb.

3. An improved water treatment system as defined in claim 1 wherein the higher voltage is approximately double the sustaining voltage of said bulb.

4. An improved water treatment system as defined in claim 1 wherein the lower voltage is approximately zero indicating that said starter circuit is short-circuited or that power is interrupted.

5. An improved water treatment system comprising a chamber, an ultraviolet (UV) light bulb for directing UV light through said chamber, a ballast and a starter circuit both connected to said bulb, and monitor means for monitoring the status of said UV bulb, the improvement comprising said monitor means comprising:
voltage monitor means for monitoring the voltage across said bulb, said voltage monitor means including a pair of circuits each connected in parallel across said bulb, each of said circuits including a zener diode and an opto-isolator device connected in series, the conducting voltages of the two zener diodes being different so that said two opto-isolator devices are activated over a different voltage range; and
signal means responsive to said voltage monitor means for emitting a signal both when the monitored voltage is higher than a desired range and when the monitored voltage is lower than the desired range.

6. An electrical circuit for an ultraviolet (UV) water treatment system comprising:
a UV light bulb;
a ballast electrically connected in series with the bulb;
a starter circuit electrically connected in parallel with the bulb;
a first monitoring circuit connected in parallel across said bulb, said first monitoring circuit being operable for emitting a first signal in response to the voltage across said bulb being below a predetermined high voltage, and a second signal in response to the voltage across said bulb exceeding the predetermined high voltage; and
a second monitoring circuit connected in parallel across said bulb, said second monitoring circuit being operable for emitting a first signal in response to the voltage across said bulb exceeding a predetermined low voltage, and a second signal in response to the voltage across said bulb being below a predetermined low voltage.

7. An electrical circuit as defined in claim 6 wherein the predetermined high voltage is approximately double the sustaining voltage of said UV bulb.

8. An electrical circuit as defined in claim 6 wherein the predetermined low voltage is approximately zero.

9. An electrical circuit for an ultraviolet (UV) water treatment system comprising:
a UV light bulb;
a ballast electrically connected in series with the bulb;
a starter circuit electrically connected in parallel with the bulb;
a first monitoring circuit connected in parallel across said bulb filaments, said first monitoring circuit emitting a signal when the voltage across said bulb exceeds a predetermined high voltage; and
a second monitoring circuit connected in parallel across said bulb filaments, said second monitoring circuit emitting a signal when the voltage across said bulb falls below a predetermined low voltage each of said first and second monitoring circuits including an opto-isolator circuit to electrically isolate the monitoring functions from said UV bulb.

10. A bulb status monitoring circuit for an ultraviolet (UV) water treatment system of the type including a UV bulb, a ballast connected in series with the bulb, and a starter circuit connected in parallel with the bulb, said circuit comprising:
   a first circuit connected in parallel with the bulb, said first circuit including a first zener diode and a first light-emitting component connected in series so that said first light-emitting component emits light when the voltage across the bulb exceeds the conducting voltage of said first zener diode;
   a first light-responsive circuit for operable emitting a first signal when light is emitted by said first light-emitting component;
   a second circuit connected in parallel with the bulb, said second circuit including a second zener diode and a second light-emitting component connected in series so that said second light-emitting component emits light when the voltage across the bulb exceeds the conducting voltage of said second zener diode; and
   a second light-responsive circuit for operable emitting a second signal when light is emitted by said second light-emitting component;
   the conducting voltages of said first and second zener diodes being selected so that said first signal is emitted when the bulb voltage is undesirably high and said second signal is not emitted when the bulb voltage is undesirably low.

11. A bulb status monitoring circuit as defined in claim 10 wherein the conducting voltage of said first zener diode is approximately double the sustaining voltage of said bulb.

12. A bulb status monitoring circuit as defined in claim 10 wherein the conducting voltage of said second zener diode is approximately zero.

* * * * *